United States Patent [19]

Lubas

[11] 3,908,835
[45] Sept. 30, 1975

[54] APPARATUS FOR CONTINUOUSLY CONVEYING AND/OR STACKING SHEET-LIKE ARTICLES, PARTICULARLY SHEET-METAL

[75] Inventor: Egon Lubas, Nievenheim-Ueckerath, Germany

[73] Assignee: HWM Hermann Weg Maschinenfabrik K.G., Dusseldorf-Heerdt, Germany

[22] Filed: June 12, 1973

[21] Appl. No.: 369,162

[30] Foreign Application Priority Data

[52] U.S. Cl. .............. 214/6
[51] Int. Cl.² ................. B65G 57/00; B23Q 05/22; B65H 29/32
[58] Field of Search.... 214/6 FS, 1 BA, 1 BS, 1 BV; 198/19, 179, 180; 271/194, 196; 294/65

[56] References Cited
UNITED STATES PATENTS

| | | | |
|---|---|---|---|
| 1,957,621 | 5/1934 | Styron | 271/196 |
| 2,921,667 | 1/1960 | Willsey | 198/179 |
| 3,168,204 | 2/1965 | Voullaire | 214/6 FS |
| 3,275,165 | 9/1966 | Vedvik | 214/1 BS |
| 3,682,469 | 8/1972 | Itoh et al. | 214/6 FS X |
| 3,823,809 | 7/1974 | Henry et al. | 214/1 BV |

FOREIGN PATENTS OR APPLICATIONS

| | | | |
|---|---|---|---|
| 28,478 | 5/1964 | Germany | 271/194 |
| 1,148,486 | 5/1963 | Germany | 214/1 BA |
| 1,205,451 | 11/1965 | Germany | 214/1 BV |
| 573,742 | 3/1958 | Italy | 214/1 BA |

Primary Examiner—Robert J. Spar
Assistant Examiner—R. B. Johnson
Attorney, Agent, or Firm—Holman & Stern

[57] ABSTRACT

Apparatus for continuously conveying and/or stacking sheets of conveyed goods, especially sheet-metal, in a horizontal plane along an endless conveyor arranged in a horizontal or vertical plane, whereby a plurality of individual transverse members, which are provided with groups of vacuum-suction cups, are arranged to revolve at equal distances from one another, and are operated by a drive; below the conveyor there are located either one or a plurality of stacking stations; groups of vacuum-suction cups on the transverse members are guidable in predetermined positions in such a manner so that they either grip or release the material being transported; the vacuum-supply for the vacuum-suction cups originating from a central vacuum supply device.

13 Claims, 9 Drawing Figures

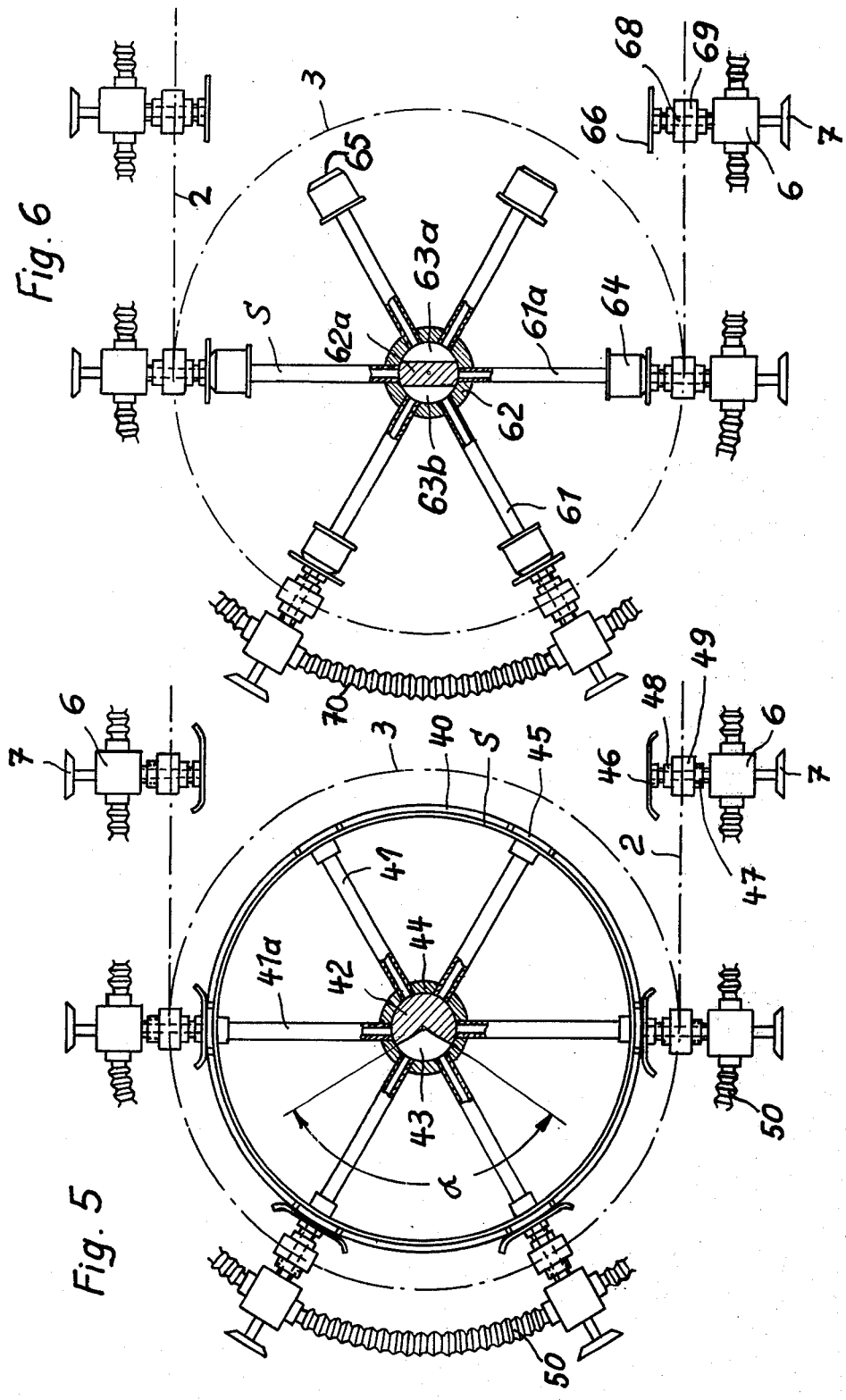

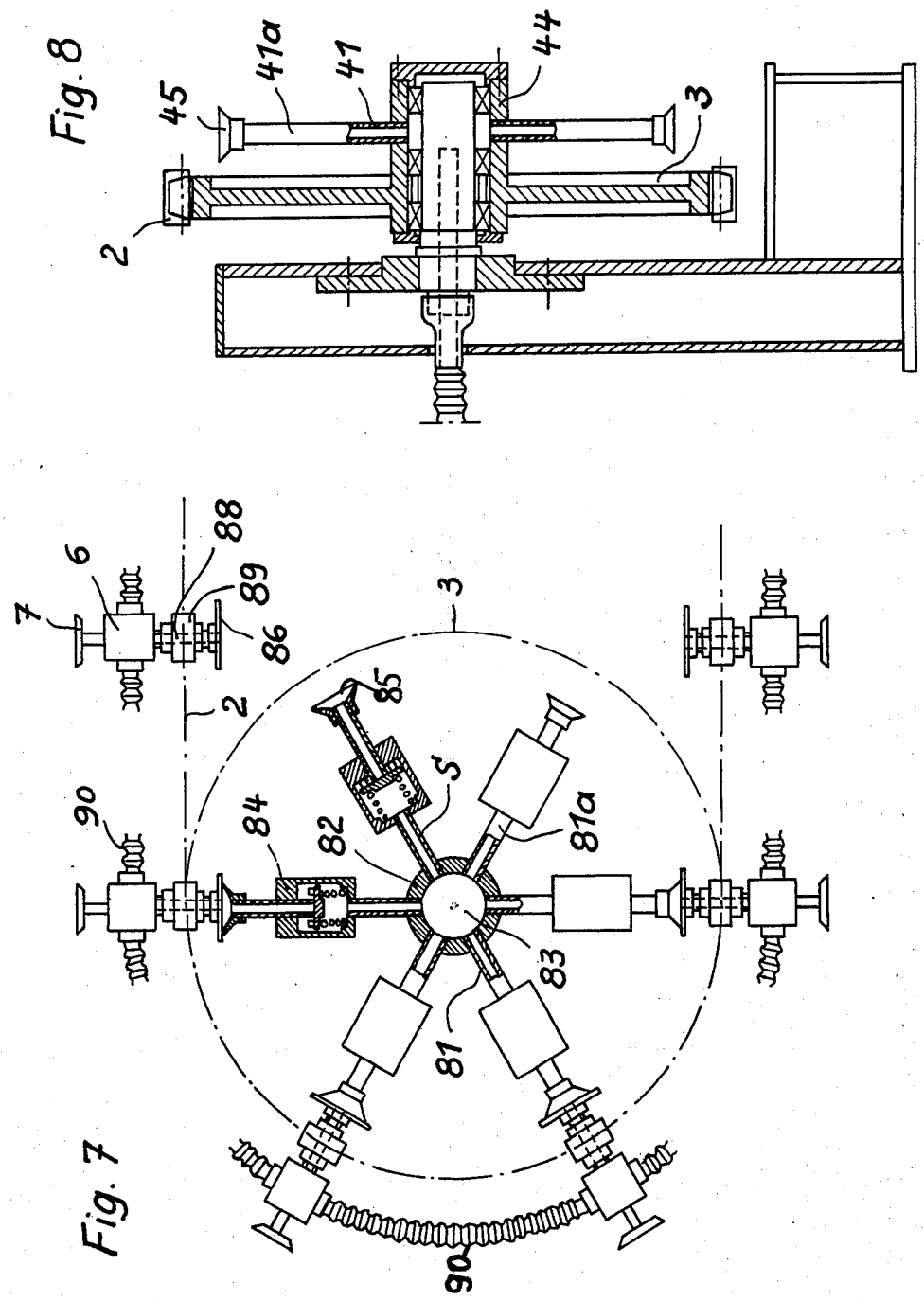

APPARATUS FOR CONTINUOUSLY CONVEYING AND/OR STACKING SHEET-LIKE ARTICLES, PARTICULARLY SHEET-METAL

BACKGROUND OF THE INVENTION

1. Field of the Invention

The instant invention concerns an apparatus for continuously conveying and/or stacking sheets of conveyed goods, especially sheet-metal, in a horizontal plane along an endless conveyor arranged in a horizontal or vertical plane, whereby a plurality of individual transverse members, which are provided with groups of vacuum-suction cups, are arranged to revolve at equal distances from one another, and are operated by a drive; below the chain-conveyor there are located either one or a plurality of stacking stations; groups of vacuum-suction cups on the transverse members are guidable in predetermined positions in such a manner so that they either grip or release the material being transported; the vacuum-supply for the vacuum-suction cups originating from a central vacuum supply device.

2. Summary of the Invention

It is the concept of the instant invention to solve the problems arising in connection with the central vacuum-supply system of a conveyor in an efficient and structurally simple manner, in order to reduce the costs of the installation and to increase its operational safety as well as to decrease maintenance requirements.

In order to solve the presented task, it is proposed that the central vacuum supply, in the area of at least one of the two end-pulleys of the conveyor, is provided with these supply sources which are synchronized and are drum- or star-shaped and are provided with concentrically arranged input pipes; the separation of the input pipes corresponds with the spacing of lifting cross-bars, and the input pipes are incorporated to sealingly function in the installation via switch-valves under the effect of vacuum in an area of a predetermined angle of rotation; the lifting cross-bars being connected with each other by means of vacuum-communicating pipes.

The instant apparatus provides the advantage that a continuous supply of the vacuum is supplied to all lifting cross-bars during the operation in a structurally relative simple manner, without the necessity for using vacuum pumps which move along with the endless conveyor belt, and without the necessity for using disproportionately long hose-pipes which endanger the clarity of control as well as the operational safety; additionally, the use of a stationary vacuum-pump is possible in applicant's invention which is preferred with regard to maintenance problems.

A further embodiment of the instant invention, as an exemplary embodiment, comprises a vacuum input point, rotating synchronously with an end-pulley, as a spoked wheel; the spokes consisting of input pipes which are supplied at their free ends with sealing lips; each sealingly connected with a respective input pipe of the lifting cross-bars (transverse bars); the input pipes of the lifting cross-bars being provided with elastic abutments which are spring-urged to abut the sealing lips of the spokes; and release-valves are incorporated in the feed-in pipes of the lifting cross-bars; valve members may also be incorporated in the spokes at the input point which open or close under spring tension; the spokes of the vacuum input point may furthermore be connectable with a rotating shell, or may be connected to each other by sequential means.

In the invention, the drum-shaped or star-shaped construction of the vacuum input points are rotatably positioned on tubes and end-pulleys, and the tubes are constructed as vacuum supply pipes; the tubes only in the area of the looping angle of the end-pulleys are functional as vacuum-supply pipes.

In a further embodiment, the tube is divided by means of a wall into two supply pipes in such a manner so that the part which is located in the area of the looping angle is constructed as a vacuum supply pipe and that part which is located in the opposite area is constructed as an air-intake pipe.

The endless conveyor into which the invention is incorporated, is known in prior art, and is constructed as an endless chain-conveyor which is supported on guide-rails, and the guide rails are arranged on an end-pulley of a tensioning device; the guide rails of the chain track, are divided and are provided with extensions which overlap each other in a stud-like manner; and the lifting cross-bars are tubular to provide hollow-spaces which function as vacuum-vessels.

Various embodiments of the instant invention are illustrated in the drawings, wherein:

BRIEF DESCRIPTION OF THE DRAWINGS

FIG. 2a is a fragmentary, enlarged detail showing overlapped ends of a conveyor guide rail;

FIG. 5 is an enlarged view of a drum-shaped vacuum input for the conveyors with portions broken away and/or shown diagramatically;

FIG. 6 is another vacuum input in the form of a spoked wheel;

FIG. 7 is a further embodiment of a vacuum input in the form of a spoked wheel; and FIG. 8 is a side-elevational view of the assembly between the vacuum input of FIG. 5 and the end-pulley of the conveyor apparatus.

DESCRIPTION OF PREFERRED EMBODIMENTS

Figure 1:
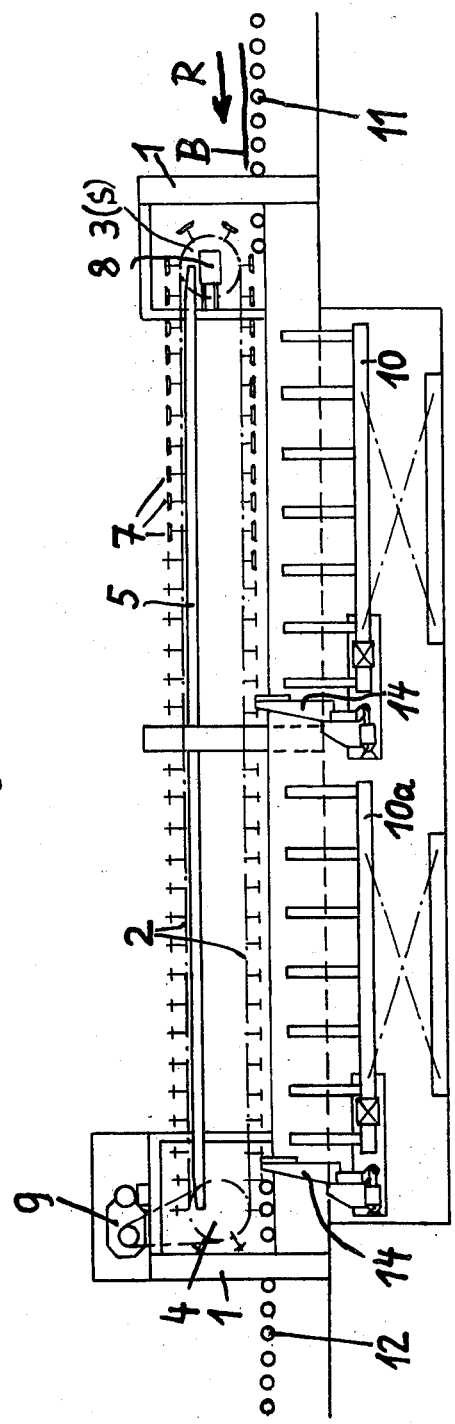
FIG. 1 is a diagramatic side-elevational view of the conveyor apparatus incorporating the invention.
Figure 2:
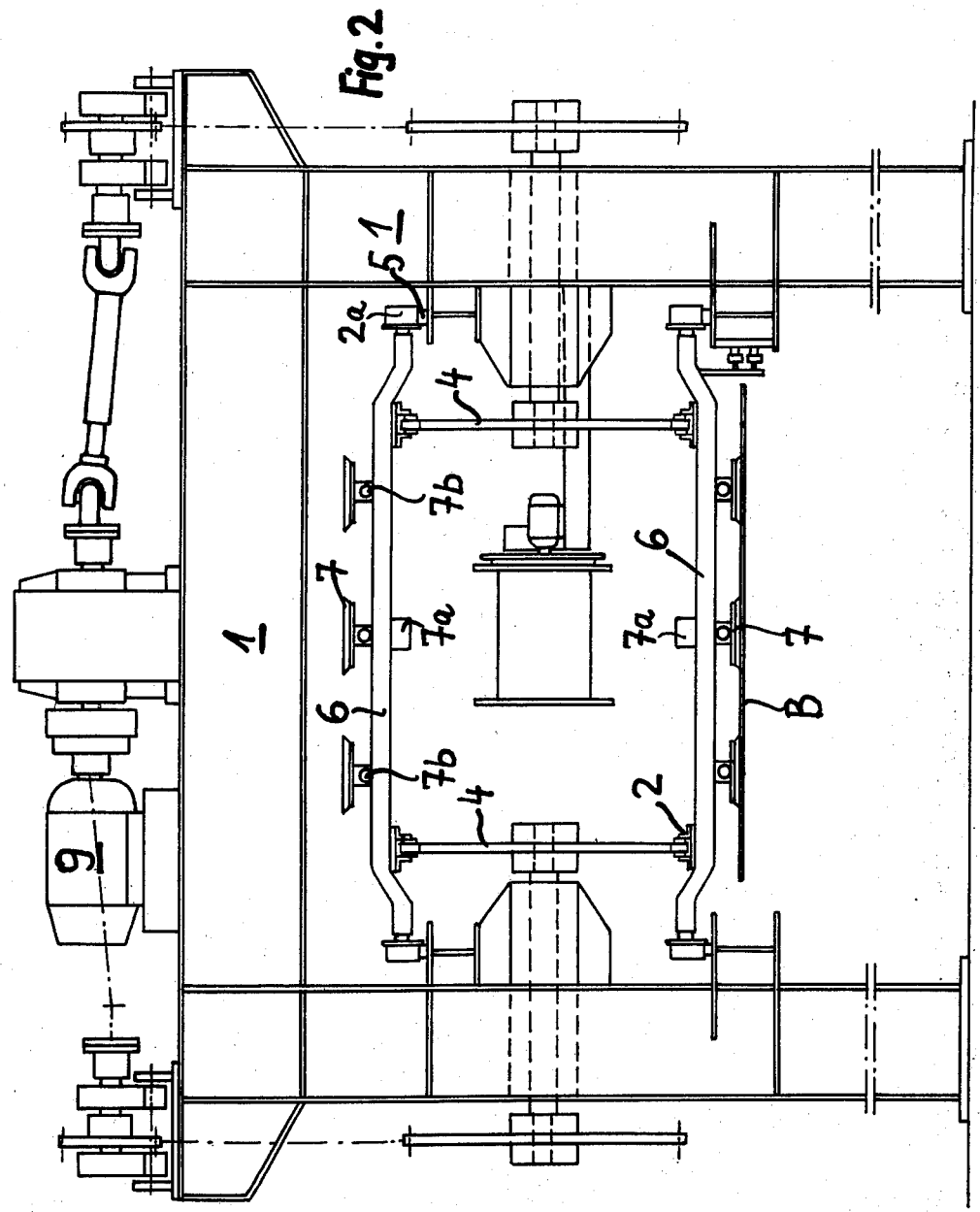
FIG. 2 is a front-elevational view of the conveyor apparatus of FIG. 1.

FIGS. 1 and 2 respectively illustrate side- and a front-elevational views of one embodiment of the instant invention, comprising an endless chain conveyor rotated in a vertical plane and having a plurality of transverse members attached thereon.

Indicated at 1 is a support frame for an endless driven conveyor chain 2 which rotates in a vertical plane; the chain 2 being guided over end-pulleys 3, 4. The chain is supported by suitably journaled rollers 2a on guide rails 5 on the frame and equally spaced relative to each other is a plurality of transverse members 6 which are fixedly attached thereto; the transverse members 6 are hollow and are provided with spaced vacuum suction cups 7 to which a vacuum source will be periodically communicated.

On one of the end-pulleys 3, there is arranged a suitably-operated, i.e., hydraulically- or pneumaticallyoperable, tensioning assembly 8 for the chain track 2 and in order that the rail guides 5 may also be tensioned or adjusted to coordinate gripping movements, they are separated and can be provided with extensions 5a (FIG. 2a) which are mutually overlapping, and which may be adjusted without interrupting the functional bearing-area of the guide rails 5. The conveyor chain 2 is driven by a suitable drive 9 (FIG. 2) which is operatively connected to the pulleys 4; below the lower run of the conveyor 2 are consecutively arranged stacking stations 10, 10a in relation to the article transport direction R.

Upstream and downstream of the stacking stations 10, 10a, are respective input and output conveyor means 11 and 12 in the direction R of the article transport; the conveyors 11, 12 may comprise gravity roller conveyors, perforated endless conveyors, rollerbeds, etc.

The stacking stations 10, 10a are each provided with transverse stops or projections 14 which can be adjusted according to the lengths of the various metal sheets B to be stacked. The stacking stations 10, 10a are preferably provided with laterally displacable funnel-shaped guides (not shown) to compactly stack the metal sheets B. Control of the vacuum suction cups 7 can be effected by means of electro-magnets (not shown) which at the conveyor input side, during the engagement of the vacuum suction cups 7 onto the metal sheets B, cause an evacuation of air in the cups and therewith cause the sheets of metal B to stick or be gripped by the vacuum suction cups 7. The metal sheets B are guided over one of the stacking stations 10, 10a, by means of either a sensor or a stop 14, it is released by means of elimination of vacuum or suction in cups 7, or the sheet is moved over the stacking points 10, 10a by means of the conveyor 12.

A vacuum-supply station S is rotatingly arranged on the shaft of the end-pulleys 3 in synchronization with suction cups as is described and illustrated in detail with respect to FIGS. 5 to 8.

Figure 3:
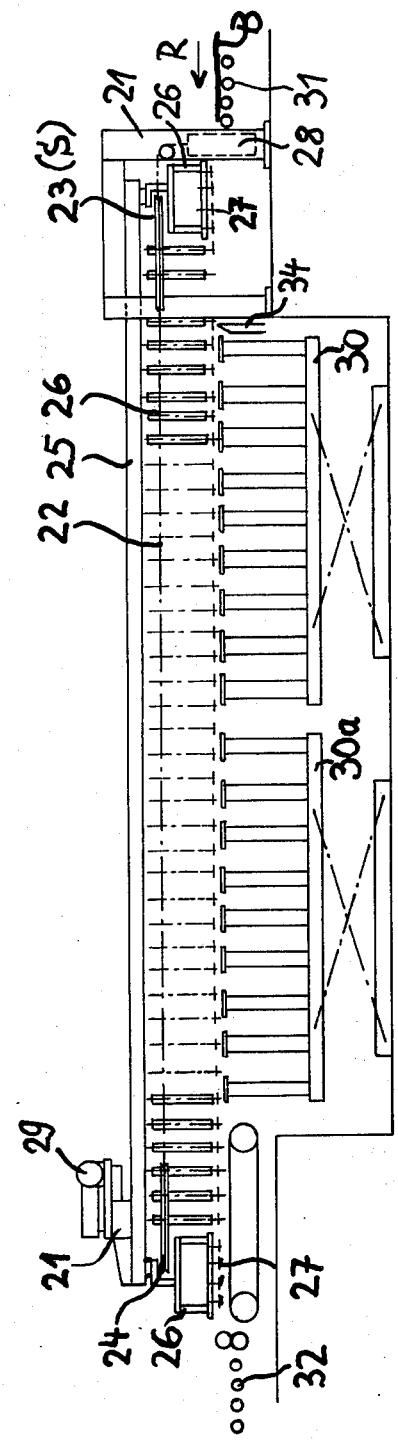
FIG. 3 is a diagramatic side-elevational view of another embodiment of a conveyor apparatus in which the invention is incorporated.
Figure 4:
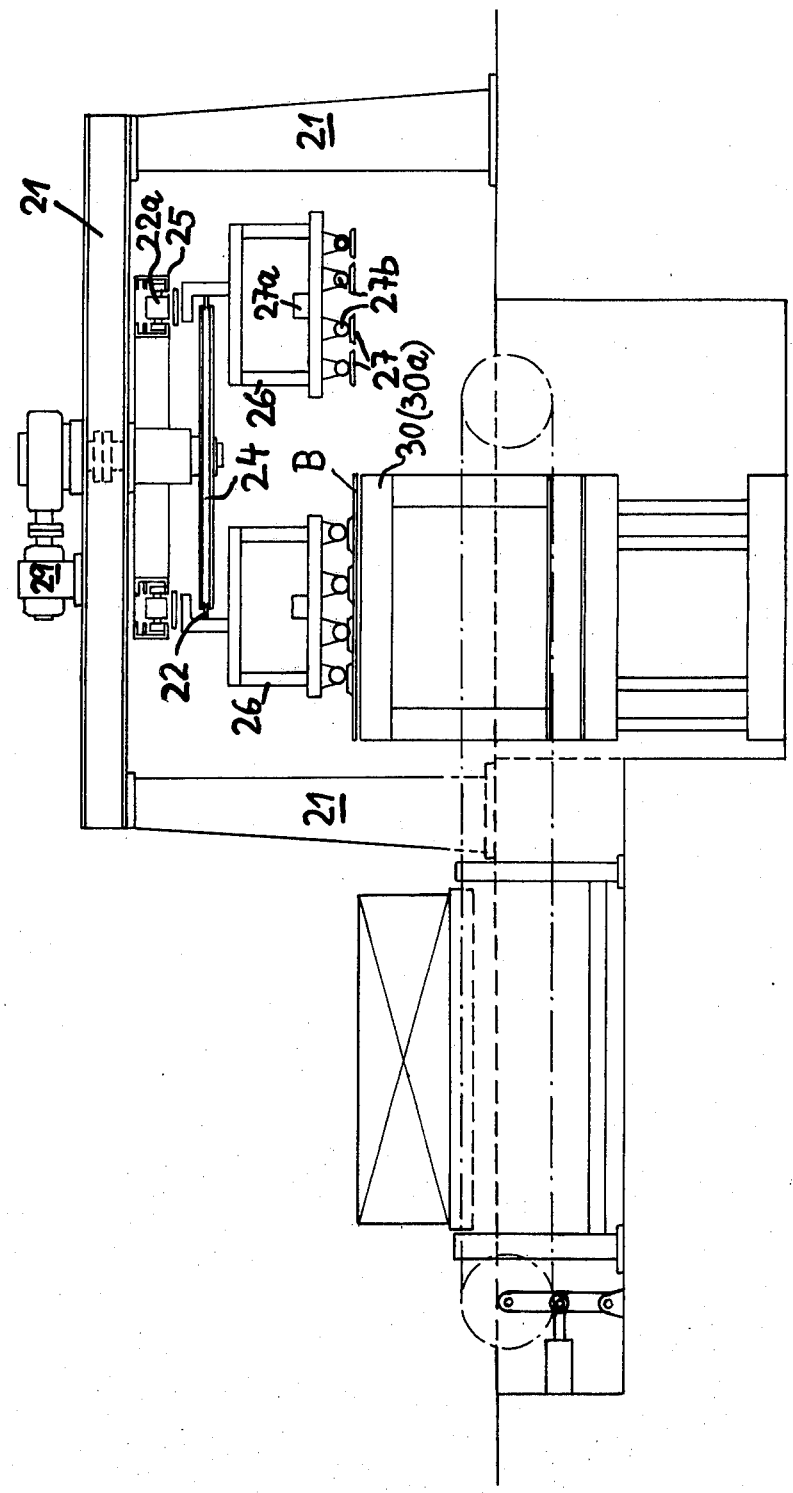
FIG. 4 is a front-elevational view of the conveyor apparatus of FIG. 3.

Another conveyor assembly in which the instant invention is incorporated is illustrated in FIGS. 3 and 4 and comprises an endless conveyor which moves in a horizontal plane, having a plurality of single crossbars suspended therefrom, which are guided on a rail track and are connected to each other by means of chains, etc. as illustrated in side and front elevational views, respectively.

A support frame 21 has mounted thereon the endless chain 22 operated by drive means 29 and which is rotatably in a horizontal plane; the conveyor chain 22 being entrained over endpulleys 23, 24. The chain 22 is supported on a rail track 25 by rollers 22a and is provided with a plurality of transverse members 26 which are suspended therefrom at equal distances from each other; the transverse members 26 are provided with vacuum suction cups 27 arranged in groups for supplying the vacuum means to grip sheets B.

A hydraulic, pneumatic, or weight-stressed member 28 is operatively connected to the conveyor chain 22 and is arranged with the end pulley 23 to tension it. In order that also the rail guides 25 are able to follow the tensional movement, they are separated and are provided with extensions 25a (see FIG. 2a) which overlap each other from both sides and which can be pulled apart without interrupting the bearing surface provided by rail guide 25. The conveyor chain 22 is activated by means of a drive 29 operatively connected with the end-pulley 24, for example. Below one run of the conveyor chain 22 are two stacking stations 30, 30a, which are arranged in consecutive order in the direction of movement R. Upstream and downstream the stacking stations 30, 30a, are arranged in the direction of the movement article input and output devices 31, 32, which may comprise roller-chain beds, perforated endless bands, roller beds, etc.

Projections 34 are arranged at each of the stacking stations 30, 30a, which are adjustable to the lengths of the various metal sheets B to be stacked. The stacking stations 30, 30a referably include laterally displacable, funnel-shaped guides (not shown) so as to effect compact stacking of the sheets B. Control of the vacuum suction cups 27 is effected by means of electro-magnets which, at the input side of the conveyor, during the engagement of the vacuum suction cups 27, effect gripping of the sheets B on the vacuum suction cups 27. The metal sheet B is guided over one of the stacking stations 30, 30a, either by means of a sensor or by the stop 34, it is then released by de-energizing the vacuum suction cups 27, or it can be moved further past the stacking stations 30, 30a to the conveyor rollers 32.

The conveyor of FIGS. 3 and 4 includes a rotating vacuum supply station S, for example, which is synchronously arranged with the end-pulley 23 on the shaft of the end-pulley, for example, as disclosed and illustrated in detail with respect to FIGS. 5 to 8.

FIGS. 5 to 7 show three embodiments for the vacuum supply station S. These are described in relation to the embodiment of FIGS. 1 and 2 but are used as well in the embodiment of FIGS. 3 and 4; for purposes of simplicity, the function of the vacuum supply is related to the embodiment of FIGS. 1 and 2.

In FIG. 5, the end-pulley 3 is shown by phantom lines and is related to endless chain 2, the transverse members 6 together with the groups of vacuum suction cups 7. The transverse members 6 are constructed as a tubular or hollow body and serve simultaneously as supports and vacuum containers. A spoked wheel 41 is provided with a cover 40 and is fixedly connected with the end-pulley 3 to rotate therewith (see FIG. 8); the spoked wheel 41 representing the vacuum supply station S; the angular separation of the spokes 41a corresponds with the distance separating the transverse members 6. The end-pulleys 2 and the spoked wheel 41 include a hollow shaft 44 through which extends a fixed axle 42 having a groove which, in the area of the looping angle $\alpha$, forms a vacuum feeder pipe 43. The spokes 41a of the wheel 41 comprise tubular members and are secured in the shaft driving collar or hub formed by the hollow shaft 44. The terminal ends of the spokes 41a carry elastic sealing rings of a synthetic material or of rubber, against which elastic pads 46 abut; these pads 46 are mounted on the transverse members 6. In the area of the looping angle $\alpha$ of the end-pulley 3, the ends 46 are under the pressure of a spring 47 and a nipple pipe 48 communicates through the elastic pads 46; the vacuum pipes or nipple 48 are connected to the vacuum container, formed by the transverse members 6, by means of an intermediate release valve 49. Continuous communication is provided to the vacuum inlet pipe 43 to the interior of the transverse members 6 by means of sealing rings 45 at the ends of the spokes 41a which will sealingly engage on the elastic pads 46. The vacuum containers formed by the plurality of transverse members 6 are connected to each other by means of conduits or conduits 50.

OPERATION

During a conveyor cycle in the area of the looping angle α of the end-pulley 3, each transverse member 6 is consecutively connected through the elastic pads 46 and the sealing rings 45 with a spoke 41a, at this time the vacuum connection is formed in the area of the looping angle α; said vacuum connection extends from the vacuum feeder pipe 43 to the vacuum chamber formed in the transverse members 6. This vacuum connection comprises on one hand the spokes 41a and on the other hand consists of the vacuum pipe or nipple 48 on the transverse member 6. In the area of the looping angle α, vacuum activates the release valve 49 in the transverse member 6 through the conduits 50, through which all transverse members 6 are connected to each other, i.e., all of the vacuum chambers of the transverse members 6 are simultaneously and continuously evacuated. As soon as a given a spoke 41a, during a cycle of rotation, leaves the area of the looping angle α, the vacuum inlet 43 is switched off, when leaving the looping angle α of the end-pulley 3 and the sealing connection which was formed between the respective spoke 41a and the elastic pad 46 of the transverse member 6 is released.

FIG. 6 shows a further embodiment of the vaccum supply station S; 3 indicates an end-pulley over which moves the endless conveyor 2 with the transverse members 6 mounted thereon, together with groups of vacuum suction cups 7. The transverse members 6 are constructed as hollow bodies and serve simultaneously as vacuum chambers. A spoked wheel 61 is rigidly connected to the one end-pulley 3. The angular spacing of the spokes 61a of wheel 61 corresponds to the spacing between transverse members 6. The end-pulley 3 and the spoked wheel 61 are secured for rotation on a hollow hub 62, which, in its vertical plane, is provided with a solid wall 62a which divides the internal hollow space of the shaft 62 into an air-supply chamber 63a and a vacuum supply chamber 63b.

Spring members 64 are attached at the outer ends of the spokes 61a and include sealing rings 65. These rings 65 sealingly engage against buffers or pads 66 on the transverse members 6 in the area of the looping angle of the end-pulleys 3, and thus form a continuous vacuum supply pipe which, during engagement of the transverse members 6, are then connected to atmospheric pressure through air supply pipe 63. A release valve 69 is provided in the vacuum pipe 68 and the transverse members 6 are connected to each other by means of elastic conduits or hose-pipes 70. The operation or evacuation of the transverse members 6 is effected in the manner as described in FIG. 5.

FIG. 7 shows another embodiment of the vacuum supply station S. Numeral 3 identifies the end-pulley over which the conveyor 2, which has the transverse members 6 afixed thereon, is guided, together with groups of vacuum suction cups 7. The transverse members 6 are constructed as hollow bodies and serve simultaneously as vacuum chambers. A spoked wheel 81 is rigidly connected to one of the end-pulleys, i.e. pulley 3. The angular spacing at the end of the spokes 81a of the wheel 81 corresponds to the spacing between the transverse members 6. The end-pulley 3 and the spoked wheel 81 are fixed to a hollow shaft 82 which functions as vacuum supply pipe 83. At the free ends of the spokes 81a are, for example, suction cups 85 which serve as sealer means, which, in the area of the looping angle of the end-pulley 3 sealingly engage against the pads 86 of the transverse members 6, and thereby form continuous supply means in the area of the transverse members 6 which are engaged on the spokes 81a. In order to provide vacuum only in the looping area of the emplaced transverse members 6, a vacuum valve 84 is switched into the spokes, the vacuum valve 84 is opened during the engagement of the pads 86 on the suction cups 85 against spring tension in the valves 84, and during separation of the pads 86 from the cup 85 the valve is closed by means of the spring tension; this enables the spokes 81a to communicate the vacuum supply pipe 83 to the members 6 during a total cycle of revolution. A release valve 89 is also switched into the vacuum supply pipe 88 of the transverse members 6. The transverse members 6 are connected to each other by means of conduits comprising elastic hose-pipes 90. The evacuation of the transverse members 6 is effected in accordance with the manner described relative to FIG. 5.

The instant invention comprises various combinations of the embodiments of FIGS. 5 to 7 with respect to the construction of the spoked wheel, construction of the spokes with valves and sealing means, constructions of the hollow shaft, and construction of the vacuum supply pipes and the sealing means on the transverse members 6.

FIG. 8 shows the typical rigid connection between an end-pulley 3 and the endless conveyor chain 2 and one of the spoked wheels according to FIG. 5, and the position of the rotatable hollow shaft 44; the vacuum feeding station S may be selectively incorporated in either one or on both of the end-pulleys 3, 4, or in pulleys 23 or 24.

I claim:

1. Apparatus for continuously conveying sheet-like articles, said apparatus comprising, in combination, endless conveyor means arranged for movement in a predetermined path of travel, said conveyor means comprising a plurality of transverse members including groups of vacuum-operated, suction cups, said transverse members being spaced equidistantly from each other on said conveyor means;

drive means operatively connected to said conveyor means for moving the transverse members along the path of travel;

at least one stacking station below said path of travel over which the transverse members pass;

control means operatively connected to the transverse members and suction cups for controlling gripping-operation of the suction cups in relation to the articles being conveyed; and vacuum supply means operatively connectable to said transverse members and said vacuum cups for connecting said transverse members and suction cups to a vacuum source, the conveyor means including a pair of spaced pulleys over which the endless conveyor is entrained, said vacuum supply means comprising a rotatable member driven in synchronization with one of said pulleys, said rotatable supply means comprising supply pipe elements extending angularly in radially extending relation from the axis of rotation thereof and terminating a chordal distance with respect to each other substantially equal to the spacing of the transverse members for sequentially engaging the transverse members as the rotatable supply means and transverse members move in unison and in a common direction, said supply pipe elements and transverse members including cooperating valve means opened through engagement between said supply pipe elements and said transverse members moving through a predetermined angle of engagement during synchronized movement for evacuating the transverse members during such engagement; and conduit means connecting the transverse members to each other whereby when transverse members are being evacuated at said supply pipe elements those suction cups engaging an article will grip the articles to be conveyed.

2. The apparatus according to claim 1, in which the supply pipe elements comprise a spoked wheel journaled on a hollow shaft, and the pipe elements include terminal seals sealingly communicable with conduits on the transverse members when the transverse members and pipe elements are engaged.

3. The apparatus according to claim 2, in which the conduits of the transverse members comprise elastic pads resiliently abuting seals of the pipe elements and release valves in the conduits of the transverse members.

4. The apparatus according to claim 2, in which the pipe elements include spring-urged valves.

5. The apparatus according to claim 2, in which the pipe elements of the vacuum supply means are connected to each other by means of a peripheral drum.

6. The apparatus according to claim 2, in which the pipe elements of the vacuum supply means are connected to each other by a central hub.

7. The apparatus according to claim 1, in which the vacuum supply means is rigidly connected to the one of said pulleys.

8. The apparatus according to claim 1, in which the vacuum supply means is journaled on a hollow shaft which is in engagement with the one pulley, and the hollow shaft comprises a supply pipe.

9. The apparatus according to claim 8, in which the hollow shaft forms a vacuum supply pipe only in the angular area of engagement between the transverse members and the pipe elements where the conveyor changes direction over said pulley.

10. The apparatus according to claim 2, in which the hollow shaft is divided longitudinally into two supply chambers by a diametric wall, one chamber being located in the area of engagement between the supply pipe elements and the transverse members and comprises a vacuum supply line and the other chamber comprises an atmospheric air supply inlet.

11. The apparatus according to claim 1, in which the endless conveyor includes a track constructed as a chain supported by guide rails, and a tension device connected to the guide rails at one of the pulleys.

12. The apparatus according to claim 11, in which the guide rails for the endless chain conveyor comprise mutually overlapping stem-like extensions for permitting tensioning.

13. The apparatus according to claim 1, characterized in that the transverse members include hollow spaces forming internal vacuum chambers.

* * * * *

UNITED STATES PATENT OFFICE
CERTIFICATE OF CORRECTION

PATENT NO. : 3,908,835
DATED : September 30, 1975
INVENTOR(S) : Egon Lubas

It is certified that error appears in the above-identified patent and that said Letters Patent are hereby corrected as shown below:

[30] Foreign Priority Data:
West Germany No. P.2228726.9
filed June 13, 1972

Signed and Sealed this thirtieth Day of December 1975

[SEAL]

Attest:

RUTH C. MASON
Attesting Officer

C. MARSHALL DANN
Commissioner of Patents and Trademarks